Nov. 14, 1944.   R. COX, JR   2,362,804
ROTARY WING FOR AIRCRAFT
Filed Dec. 15, 1943   2 Sheets-Sheet 1

INVENTOR.
RALPH COX, JR.
BY
ATTORNEYS.

Nov. 14, 1944. R. COX, JR 2,362,804
ROTARY WING FOR AIRCRAFT
Filed Dec. 15, 1943 2 Sheets-Sheet 2
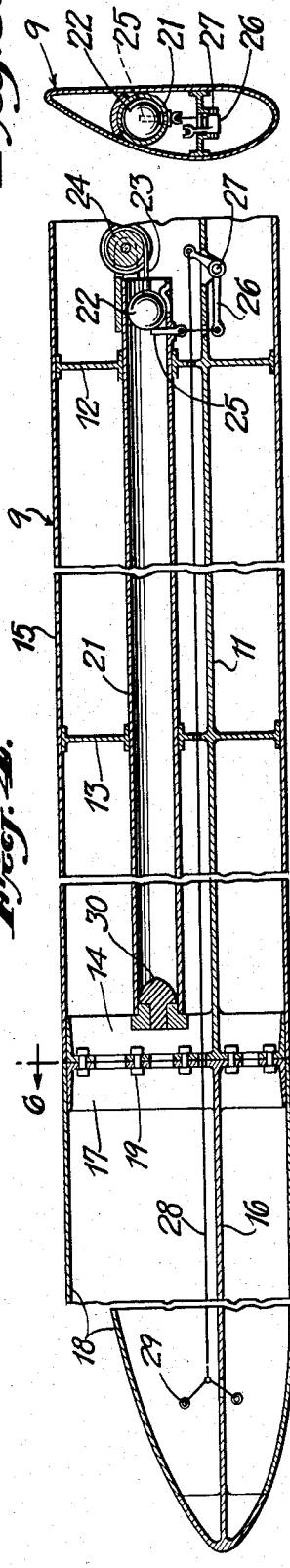
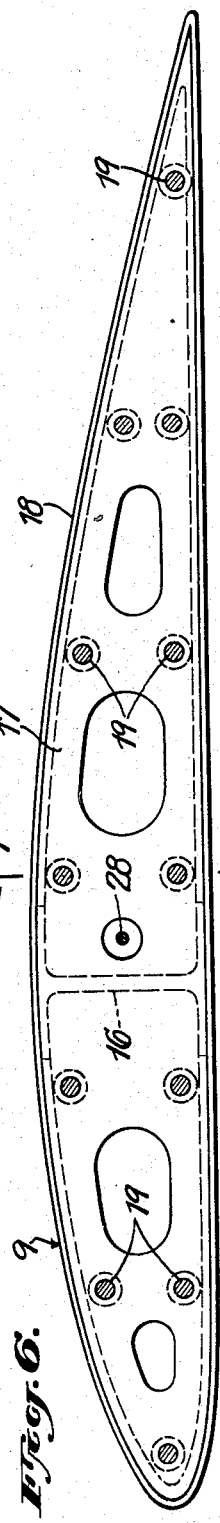
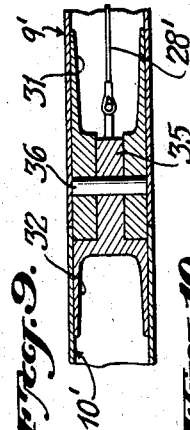
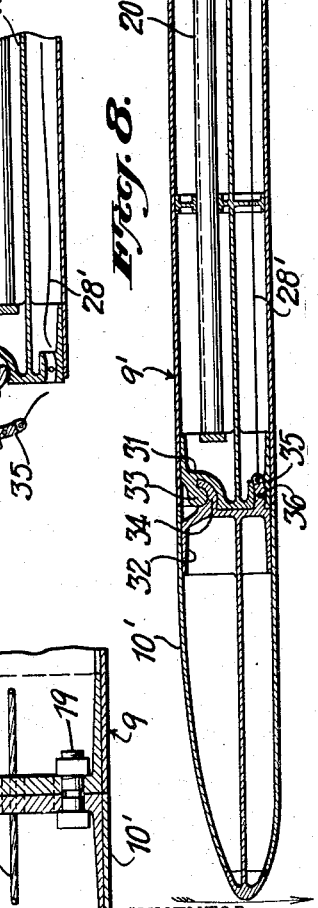
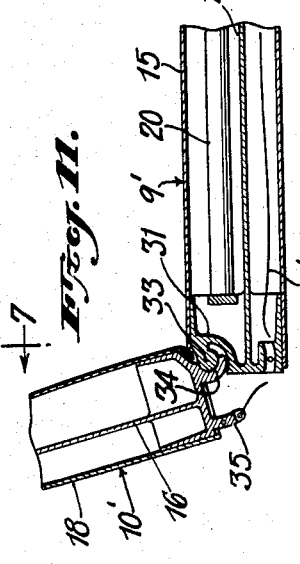
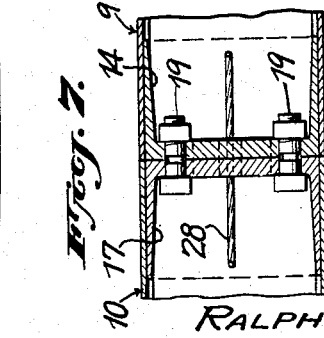
INVENTOR.
RALPH COX, JR.
BY
his ATTORNEYS.

Patented Nov. 14, 1944

2,362,804

UNITED STATES PATENT OFFICE 2,362,804

ROTARY WING FOR AIRCRAFT

Ralph Cox, Jr., Pittsburgh, Pa.

Application December 15, 1943, Serial No. 514,340

8 Claims. (Cl. 170—159)

This invention relates to helicopters and more particularly a mechanism for maintaining dynamic balance of rotating wings such as a lifting propeller when said wings are damaged as by striking an object in flight.

In aircraft such as helicopters which utilize rotating wings, the lift or sustaining force is dependent upon continued rotation of said wings. It is well recognized that one of the difficulties in helicopters resides in the ever-present danger of damage being suffered to the rotating wings during flight, such as by striking a fixed object or a large bird. Such damage is more likely to occur adjacent the tips of the respective airfoil sections or blades. In addition to the damaged structure causing an appreciable increases in resistance or drag, parts broken off at the tip cause a serious dynamic unbalance. Such dynamic unbalance results in serious damage if not complete destruction of the aircraft.

An object of the invention is to provide mechanism which will maintain dynamic balance of the rotating lifting wings when the tips of one or more blades are damaged.

Another object of the invention is to provide means for eliminating increased resistance due to a damaged blade tip.

In general, the invention contemplates constructing the individual wings or blades with detachable tips formed by separate units secured to the main body portion in such a manner that upon a predetermined force being delivered to the tip, the tip will be cleanly and entirely sheared or broken at its point of attachment with the main section, thus eliminating the increase in resistance or drift due to the damaged tip. The severance of the tip also serves as a means for controlling the shifting of weight of the main body of the blade so as to neutralize the loss of the weight of the tip and maintain dynamic balance of the propeller.

Further objects and advantages of the invention will be in part obvious and in part specifically referred to in the description hereinafter contained which, taken in conjunction with the accompanying drawings, discloses certain preferred embodiments of the invention. Such embodiments, however, should be considered as merely illustrative of the principles of the invention in its broader aspects.

In the drawings—

Fig. 4 is a similar view showing further details of construction;

Fig. 5 is an end view of Fig. 4;

Fig. 6 is a cross-sectional view taken at line 6—6 of Fig. 4;

Fig. 7 is a sectional view taken at line 7—7 of Fig. 6 showing further details of the shear connection;

Fig. 8 is a plan view, with certain parts in section, showing a modified form of structure; and Figs. 9, 10 and 11 are sectional views showing further details of the modification illustrated in Fig. 8.

Figure 2:
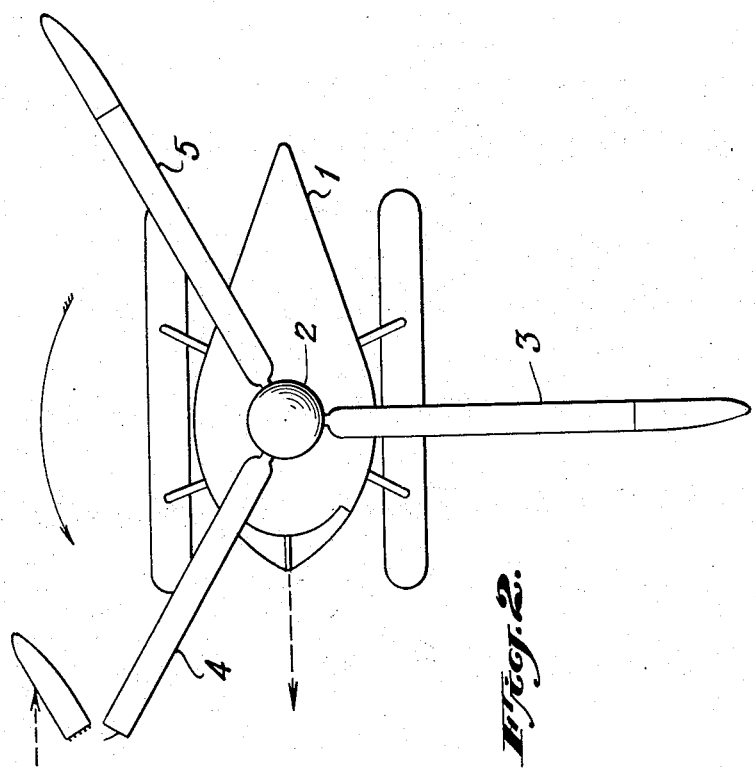
Fig. 2 is a similar view illustrating the severance of a tip of one of the blades due to an impact delivered thereagainst.
Figure 1:
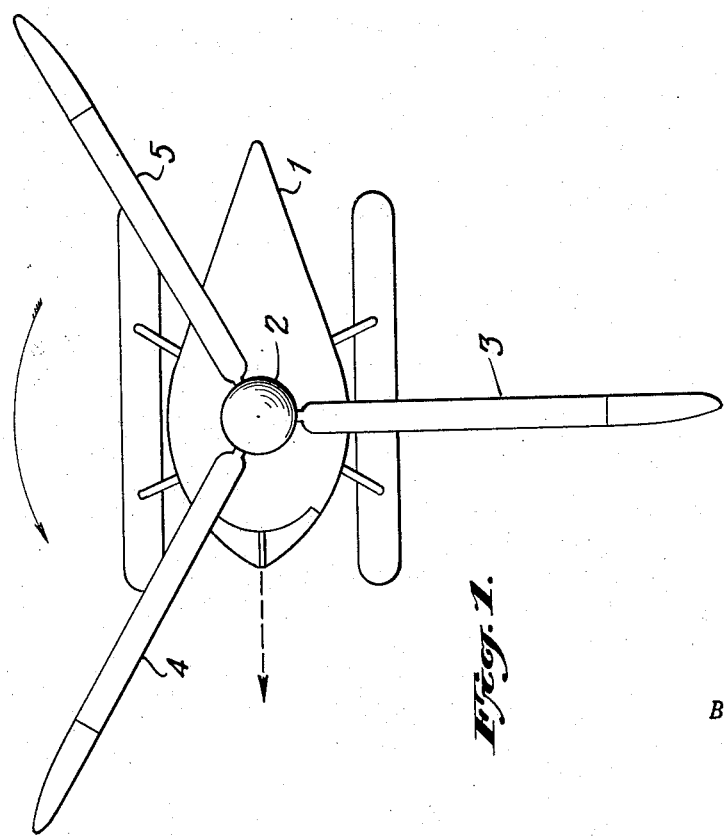
Fig. 1 is a plan view of a helicopter having a propeller embodying the invention.
Figure 3:
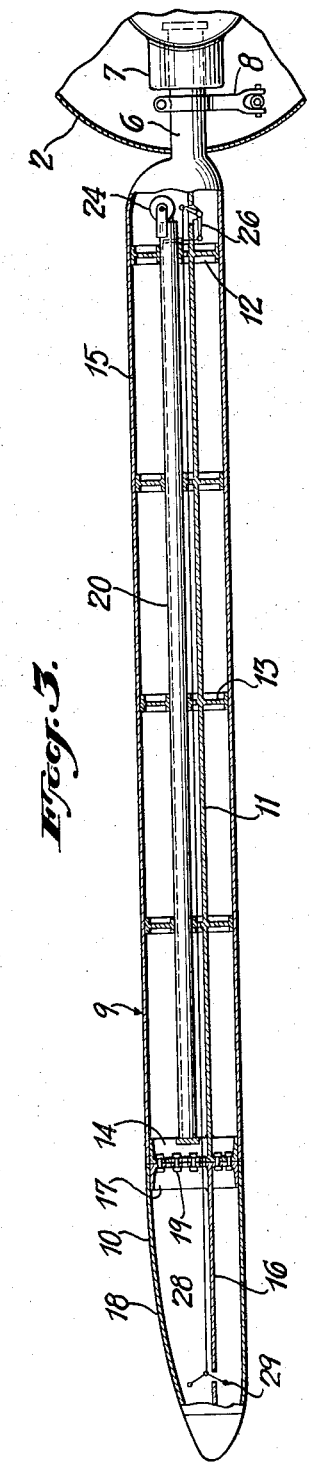
Fig. 3 is an enlarged section of a plan view of one of the blades showing further details of the arrangement of the parts.

Referring more particularly to Figs. 1, 2 and 3, the helicopter body is designated as 1 and is adapted to be supported by rotating wings such as by a propeller 2 having a plurality of airfoils, such as the blades 3, 4 and 5. Each of the blades is provided with a root end, such as 6, which is preferably journaled in a hub arm 7 to provide for adjustment of the angle of pitch, such as by mechanism designated as 8. Such mechanism for pitch adjustment not forming a part of the present invention will not be specifically described; but may take the form of any suitable arrangement, such for example as that disclosed in my copending application Serial No. 495,578, filed July 21, 1943.

Each of the blades comprises a main body portion 9 and a tip portion 10 (Fig. 3). The body portion 9 is constructed with a suitable longitudinal member such as 11 and ribs such as 12, 13 and 14 rigidly secured thereto and to which is suitably secured an outer surface wall such as 15; the tip portion 10 being suitably constructed as by a longitudinal member 16 and a rib or cross member 17 which carry an outer casing or enclosure member 18. The body 9 and tip 10 are secured together at the junction between the end pieces 14 and 17, as by means of shear bolts 19 which are made of a relatively soft material or are of such size as to provide sufficient tensile strength to hold the tip in position during normal operation and of sufficient shear strength to withstand the maximum air resistance; but sufficiently low in shear strength to fail on the tip encountering a predetermined impact. For example, the shear bolts 19 will have a total strength substantially less than that required to damage the remaining wing structure and less than that which would materially distort or damage the tip section. If desired the bolts 19 may be of relatively large diameter at their ends and a reduced diameter 20 provided intermediate their ends in accordance with the predetermined strength desired.

Each of the body portions such as 9 is provided with suitable means for varying its center of gravity by shifting a portion of the weight of the body portion outwardly so as to compensate for the loss of weight of the tip portion. In the present embodiment, this is provided for in the manner now to be described. A suitable guideway 21, which in the present embodiment takes the form of a tube, is suitably supported by the framework, such as the ribs 12 and 13 of the body 9, and extends lengthwise of said body so as to lie in the general radial direction from the propeller axis. A suitable weight 22 is disposed within the guideway 21 for movement outwardly therein under centrifugal force due to the rotation of the propeller. Suitable means is provided to prevent too-rapid outward movement of the weight 22, and in the present embodiment this takes the form of a cable 23, one end of which is attached to the weight 22 and the other end secured to a friction pulley 24 around which the cable is wrapped; the friction of the pulley being such as to exert sufficient braking force on the outward movement of the weight 22 while permitting its rapid outward movement. The weight 22 is positively held inwardly toward the root end of the blade by suitable releasable means such as the pin 25 which has a push fit in a hole provided in the wall of tube 21. The pin is connected by a suitable link with one end of a lever 26 pivotally mounted as at 27 and whose other end is engaged by a cable 28 which extends outwardly and is attached as at 29 to the tip portion 10. The cable 28 is sufficiently strong to positively remove the pin 25 when tension is placed on the cable due to the severance of the tip 10; but is of such strength that it will readily break after the pin 25 has been withdrawn so as to permit a free breaking off of the tip 10 when the bolts 19 fail due to the impact on the tip 10. A resilient stop such as a rubber plug 30 may be provided in the outer end of the guideway 21 so as to absorb the shock of the weight 22. The tip 10 being of relatively light construction will not necessitate any great increase of the overall weight of the structure by the addition of the weight 22; and the weight 22 will be proportioned in accordance with the weight of the tip 10, the distance of the center of gravity of the tip 10 from the axis of the propeller and the initial position of weight 22 and the extent of its travel outwardly. In other words, the disposition of the weight 22, its weight and the extent of its travel will be such as to vary the radial position of the center of gravity of the body portion 9 an amount sufficient to compensate for the loss of the tip 10 and thus maintain substantially the same dynamic balance of the rotating propeller about its axis after the tip 10 is severed as before it was severed. It is within the contemplation of the invention that the weight 22 might be kept to a minimum by providing an open end in the tube 21 in register with an enlarged opening in the cross-piece or rib 14 and making the cable 23 of such length that the weight 22 upon detachment of the tip 10 will be permitted to move outwardly under centrifugal force beyond the end of the tube 21, thus permitting a relatively longer travel or movement of the weight 22; the weight 22 then being limited by being suspended on the end of the cable 23. It is also within the contemplation of the invention that instead of providing a supplemental weight 22, a portion of the structure of the body portion 9 may be movably disposed under the control of the severance of the tip 10. For example, this may be conveniently accomplished by providing a telescoping portion of the body portion 9 which may be moved outwardly upon severance of the tip 10, and in such embodiment of the invention this would additionally provide for the maintenance of aerodynamic balance.

MODIFICATION
(Figs. 8–11 inclusive)

Instead of using shear bolts such as 19 for detachably securing the tip 10 to the body 9, the detachable means illustrated in Figs. 8–11 inclusive may be employed. In this modification, the body portion is designated in general as 9' and the tip portion as 10'. The body portion carries an end member 31 and the tip portion carries a cooperating member 32. The members 31—32 carry respectively cooperating hinge elements 33—34 adjacent the trailing edge and provision is made adjacent the leading edge for holding the tip in position as by means of a tongue 35 (see also Fig. 9) carried by the tip member 32 and engageable by a shear pin 36 extending through the tongue 35 and cooperating bores provided in the member 31. The tongue 35 serves as a means of attachment for the outer end of a release cable 28' which serves to actuate the release mechanism in the manner previously described. It will, therefore, be seen that upon a predetermined impact being delivered to the tip 10', a resultant force in a rearward direction will cause the tip to pivot about the hinge pin 33, thus shearing the pin 36 (Figs. 10 and 11), which will first place the cable 28' under sufficient tension to release the weight 22' and thereafter break the cable 28' and permit the tip portion 10' to swing rearwardly (Fig. 11) and completely disengage itself from the body portion 9'.

Instead of utilizing the cable and friction pulley arrangement for controlling the outward rate of movement of the weight, such as 22, the weight 22 may be given such fit within the tube 21 as to brake its outward movement pneumatically. In place of the tip 21, the guideway may be otherwise formed as by rails or rods; and instead of utilizing a stop such as pin 25, a positive stop or brake for preventing the rotation of pulley 24 may be releasably connected to the forward end of the lever 26, as will be well-understood by those skilled in the art.

Having thus described my invention with particularity with reference to presently preferred forms of the same, it will be obvious to those skilled in the art after understanding the invention, that various other changes and modifications may be made therein without departing from the scope of the invention, and it is my intention to cover in the appended claims, such changes as come within the scope of the invention.

What I claim is:

1. A rotary airfoil for aircraft comprising a body portion having a root end and a separable tip portion at the opposite end, said tip portion being secured to said body portion by relatively fragile means so as to provide a transversely extending zone of detachment at which said tip portion will be severed from said body portion upon a predetermined impact being delivered to said tip, a weight carried as a part of said body portion and movable longitudinally thereof, and restraining means holding said weight toward said root end and operable to release said weight for limited outward movement upon forceful detachment of said tip portion.

2. A rotary airfoil for aircraft comprising a body portion having a root end and a separable tip portion at the opposite end, said tip portion being secured to said body portion by relatively fragile means so as to provide a transversely extending zone of detachment at which said tip portion will be severed from said body portion upon a predetermined impact being delivered to said tip, a weight carried as a part of said body portion and movable longitudinally thereof, means normally holding said weight toward said root end and means for releasing said holding means, said last means being actuated by the detachment of said tip, and means for limiting the outward movement of said weight to a predetermined distance of travel.

3. A rotary airfoil for aircraft comprising a body portion having a root end and a separable tip portion at the opposite end, fastening means for securing said tip portion to said body portion, said fastening means being substantially weaker than the body portion providing a transversely extending zone of detachment at which said tip portion will be severed from said body portion upon a predetermined impact being delivered to said tip, whereby the airfoil will be freed of damaged structure, a weight carried by said body portion, a guideway for said weight extending longitudinally of said body portion, and means holding said weight toward the inner end of said guideway, said holding means comprising a part held in position by said tip portion and operable to release said weight for limited outward movement upon forceful detachment of said tip portion.

4. A rotary airfoil for aircraft comprising a body portion having a root end and a separable tip portion at the opposite end, fastening means for securing said tip portion to said body portion, said fastening means being substantially weaker than the body portion providing a transversely extending zone of detachment at which said tip portion will be severed from said body portion upon a predetermined impact being delivered to said tip, whereby the airfoil will be freed of damaged structure, a weight carried by said body portion, a guideway for said weight extending longitudinally of said body portion, means holding said weight toward the inner end of said guideway, said holding means comprising a part held in position by said tip portion and operable to release said weight for limited outward movement upon forceful detachment of said tip portion, and means for preventing free outward movement of said weight when said holding means is released.

5. Mechanism for maintaining dynamic balance in helicopter propellers comprising propeller blades having respectively detachable tips secured in place along relatively weakened zones, whereby upon a predetermined impact against respective of said tips they are completely severed from respective of said blade bodies, masses comprised as a structural part of respective of said blades mounted for movement in a radial direction radially of said propeller axis, and means for selectively maintaining said masses in relative inward and outward positions respectively in accordance with the presence or absence of said respective tips.

6. Mechanism for maintaining dynamic balance in helicopter propeller comprising propeller blades having respectively detachable tips secured in place along relatively weakened zones, whereby upon a predetermined impact against respective of said tips they are completely severed from respective of said blade bodies, masses carried by said blade bodies and mounted for movement in a direction radially of said propeller axis, and means under control of said severable tips for maintaining a balanced dynamic couple between respective of said tips and masses, whereby the dynamic balance of said propeller is maintained upon the detachment of said respective tips.

7. Mechanism for maintaining dynamic balance in helicopter propellers comprising propeller blades having respectively detachable tips secured in place along relatively weakened zones, whereby upon a predetermined impact against respective of said tips they are completely severed from respective of said blade bodies, masses comprised as a part of respective of said blades mounted for movement relative thereto in a direction radially of said propeller axis, and means for selectively maintaining said masses in relative inward and outward positions respectively in accordance with the presence or absence of said respective tips, the weight and disposition of said masses and their radial movement being so proportioned with respect to the weight and disposition of said tips that the severance of respective of said tips will be dynamically balanced by the movement of respectively corresponding masses.

8. Mechanism for maintaining dynamic balance in helicopter propellers comprising propeller blades having respectively detachable tips secured in place along relatively weakened zones, whereby upon a predetermined impact against respective of said tips they are completely severed from respective of said blade bodies, said blade bodies having means for varying the distance of their respective centers of gravity from the axis of said propeller an amount equal to the variation in the distance of the center of gravity of said respective blades from said propeller axis due to the severance of respectively corresponding tips, said last-mentioned means comprising radially shiftable weights carried as a part of the total weight of said respective blades and control means interconnected to respective of said tips.

RALPH COX, Jr.